May 26, 1936. R. TRESKOW 2,042,132

PIPE JOINT

Filed June 25, 1934

Inventor:
Robert Treskow
By (signature)
Attorney.

Patented May 26, 1936

2,042,132

UNITED STATES PATENT OFFICE 2,042,132

PIPE JOINT

Robert Treskow, Berlin-Steglitz, Germany

Application June 25, 1934, Serial No. 732,360
In Germany April 12, 1933

4 Claims. (Cl. 138—85)

The present invention relates to an expansion joint for metal-cored reinforced concrete pipes.

With a view to preventing the formation of cracks during the drying of the compressed concrete, and in order to provide the possibility of expansion for pipe-lines which are subjected to fluctuations of temperature, specially designed expansion joints, as described in greater detail below, may be arranged at certain intervals.

The invention is illustrated in the accompanying drawing by way of example, as follows.

Figure 1:
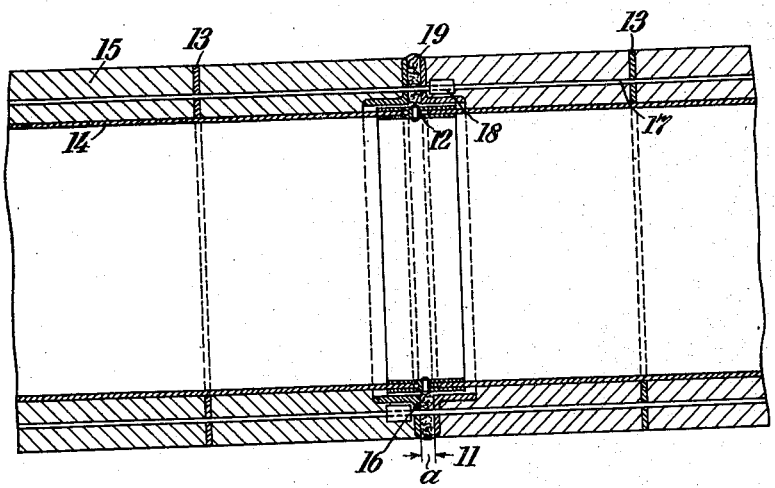
Figure 1 is a view of an expansion joint built into the pipe-line.
Figure 2:
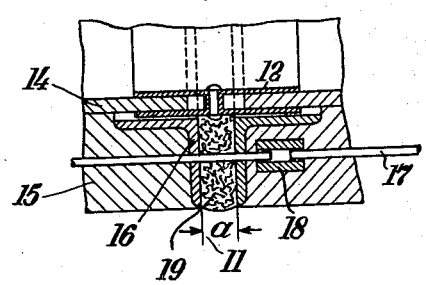
Figure 2 shows a part of the expansion joint on an enlarged scale.
Figure 3:
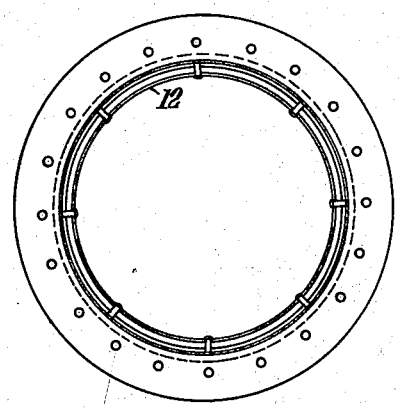
Figure 3 is a vertical section through the expansion joint.

The reinforcing iron rods 17 lie in one or several layers supported in guide rings 13, the shape of which corresponds to the desired shape of the pipe-line to be built.

With a view to allowing for expansions in the pipe-line and the prevention of cracks, which might arise through the drying of the compressed concrete, it is desirable to provide expansion joints in the pipe-line. These expansion joints are constructed as follows.

At the place where two core-pipes 14 meet without quite touching each other a double walled sleeve 12 is placed on the core-pipes, the ends of the latter being inserted between the walls. These two walls 12 are connected together by rivets, enclosed in distance-pieces. Two strengthening rings 16 of angle iron, the flanges of which lie at right-angles to the direction of the pipeline and are provided with holes, the flanges thus being used as guide rings for the iron rods 17, are placed around the outer wall of the sleeve. Between these two flanges a space 11 is provided for, which is filled up with a plastic material, for example, bitumen. The iron rods 17 are not welded together at these expansion areas, but they are connected in a flexible manner. In accordance with the invention they can also be connected together by a coupling or muff joint 18 pushed over their ends, which do not quite touch each other. The coupling 18 should not lie between, but preferably at the side of the flanges of the rings 16 and should be pressed down into concrete layer 15. The expansion area thus possesses the same strength as the rest of the pipeline.

I claim as my invention:

1. Expansion joint for metal-cored reinforced concrete pipes comprising a double-walled sleeve between the walls of which the spaced opposed ends of the metal cores are located, a ring of angle profile iron on each side of the joint plane having one flange encircling the outer wall of the sleeve and the other flange spaced from the joint plane, longitudinal reinforcing bars supported by said angle rings, joint sealing material in the space bounded by the said other flanges and the sleeve, and a concrete envelope about said cores and bars.

2. Expansion joint for metal-cored reinforced concrete pipes comprising a double-walled sleeve between the walls of which the spaced opposed ends of the metal cores are located, a ring of angle profile iron on each side of the joint plane having one flange encircling the outer wall of the sleeve and the other flange spaced from the joint plane, joint sealing material in the space bounded by said other flanges and the sleeve, longitudinal reinforcing bars extending through the sealing material and supported by said angle rings, a concrete envelope about said cores and bars, and muff joints in said reinforcing bars and located in the concrete envelope.

3. Expansion joint for metal-cored reinforced concrete pipes comprising a double-walled sleeve between the walls of which the spaced opposed ends of the metal cores are located, a ring of angle profile iron on each side of the joint plane having one flange encircling the outer wall of the sleeve and the other flange spaced from the joint plane, longitudinal reinforcing bars supported by said angle rings, longitudinal reinforcing bars supported in holes in said angle rings, joint sealing material in the space bounded by the said other flanges and the sleeve, and a concrete envelope about said cores and bars.

4. Expansion joint for metal-cored reinforced concrete pipes comprising a double-walled sleeve between the walls of which the spaced opposed ends of the metal cores are located, a ring of angle profile iron on each side of the joint plane having one flange encircling the outer wall of the sleeve and the other flange spaced from the joint plane, longitudinal reinforcing bars supported by said angle rings, joint sealing material in the space bounded by the said other flanges and the sleeve, a concrete envelope about said cores and bars, and bar supporting rings encircling the cores beyond the joints.

ROBERT TRESKOW.